Feb. 19, 1935.  A. E. DRISSNER  1,991,382
INDEXING MECHANISM FOR AUTOMATIC MULTIPLE SPINDLE SCREW MACHINES
Filed Jan. 23, 1934   5 Sheets-Sheet 1

Feb. 19, 1935. A. E. DRISSNER 1,991,382
INDEXING MECHANISM FOR AUTOMATIC MULTIPLE SPINDLE SCREW MACHINES
Filed Jan. 23, 1934

Patented Feb. 19, 1935

1,991,382

UNITED STATES PATENT OFFICE 1,991,382

INDEXING MECHANISM FOR AUTOMATIC MULTIPLE SPINDLE SCREW MACHINE

Alfred E. Drissner, Cleveland, Ohio, assignor to The National Acme Company, Cleveland, Ohio, a corporation of Ohio Application January 23, 1934, Serial No. 707,874

30 Claims. (Cl. 29—50)

This invention relates to automatic multiple spindle screw machines, the object being to provide an improved indexing mechanism for the work spindle carrier thereof, particularly work spindle carriers having a series of six rotary work or stock rod carrying spindles, by means of which the work spindle carrier may be successively indexed one spindle at a time or two spindles at a time during each cycle of operation of the machine. In other words, the work spindle carrier may be indexed one-sixth of a rotation at each indexing operation of the machine or one-third of a rotation at each indexing operation of the machine. When indexed one-third of a rotation, similar work may be done on two work spindles at the same time. Thus, two forming tools may operate on the work of a pair of spindles, two threading tools may operate on the work of another pair of spindles, for instance those upon which the forming operations have already been done, and two cutting-off tools may operate on the work of another pair of spindles although, of course, when the carrier is indexed one-third of a cycle at a time, different work may be performed on the different stock rods of the work carrier so that, with this improved indexing mechanism, during each cycle, a piece of work may be completely formed and cut off or two pieces of work may be completely formed and cut off according to the manner in which the indexing mechanism is set.

This improved indexing mechanism may be substituted for the indexing mechanism shown and described in Fig. 18 of the contemporaneously pending application of A. E. Drissner and C. W. Simpson, Serial Number 632,490, filed September 10th, 1932.

When a six spindle work carrier is used, such as illustrated in Fig. 30 of that application, the multiple spindle machine to which this improved indexing means may be applied is otherwise substantially similar to that shown and described in said application. This work spindle carrier or cylinder having, in the present instance, a series of six rotary work carrying spindles rotated by means of a central driving shaft is indexed by a suitable indexing mechanism from a main cam shaft.

At each indexing of the work spindle carrier, suitable cross working tools such as side and top working tools are shifted into position to perform various kinds of work on the stock rods carried by the work spindles. At the same time, suitable and working tools carried by a sliding tool carrier are brought into position to perform work on the ends of the stock rods, this main sliding tool carrier also being operated from the cam shaft and, as before stated, the present improvement has to do with the indexing of the work spindle carrier when that carrier is provided with a series of six spindles although, obviously, the same improvement might be applicable to a work spindle carrier having any desired number of work spindles, usually of an even number.

In practice, for plain work, it is only necessary at times to use three spindles to finish a job but, in complicated work, it is necessary to use six spindles and when the machine is used with that class of work where the work is not complicated, by using three spindles, obviously, then, by doing similar work on each pair of spindles, twice the amount of work may be accomplished in the same time.

In the drawings accompanying and forming a part of this specification, Fig. 1 is a side view of a portion of the multiple spindle screw machine shown in Fig. 1 of the application hereinbefore referred to, illustrating, however, six work spindles instead of four, it more particularly illustrating that end of the machine carrying the work spindle carrier and its rotating work spindles.

Similar characters of reference indicate corresponding parts in the several views.

Figure 1:
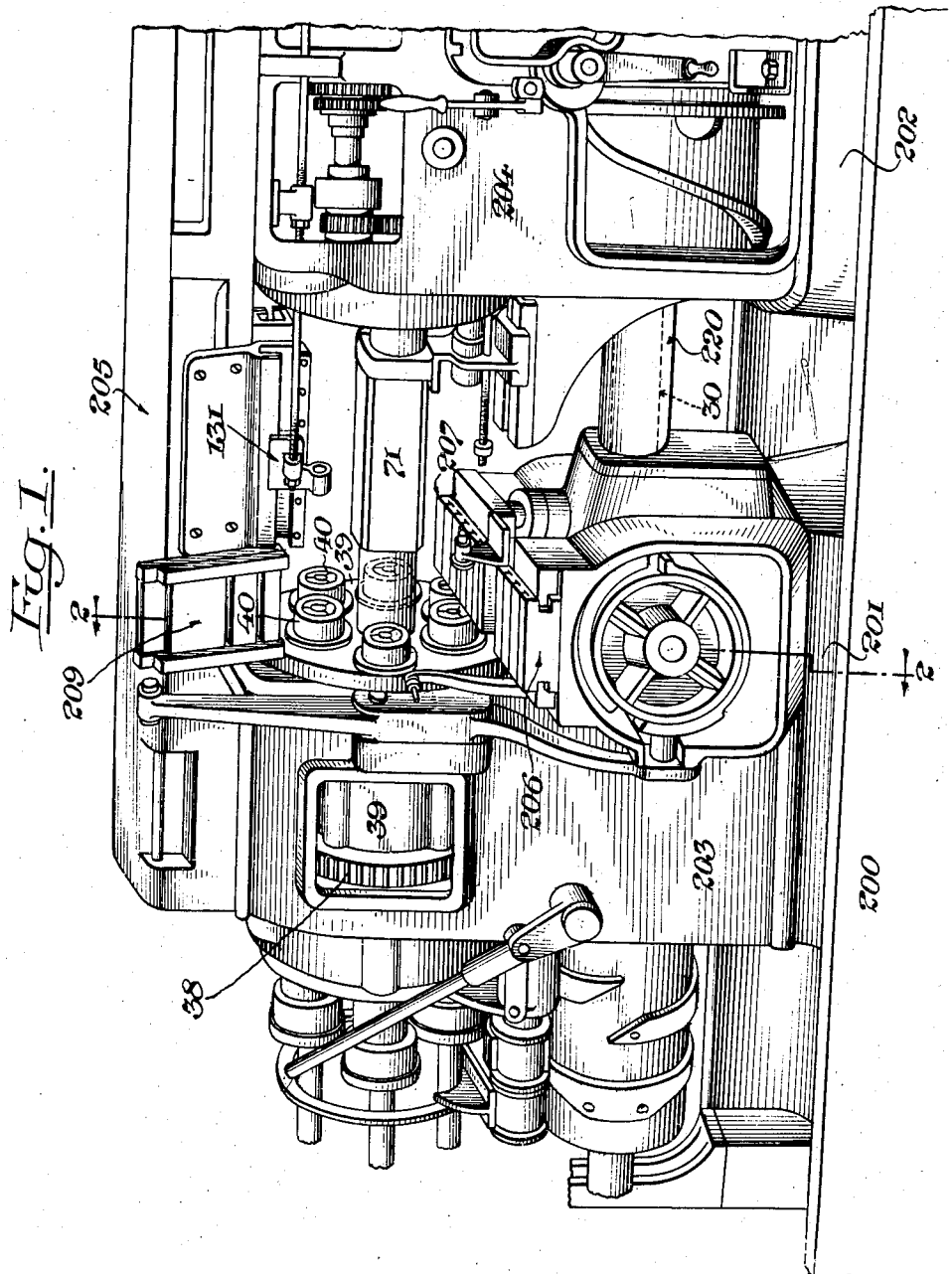

Before explaining in detail the present improvement and mode of operation thereof, I desire to have it understood that the invention is not limited to the details of construction and arrangement of parts illustrated in the accompanying drawings since the invention is capable of other embodiments, and that the phraseology which I employ is for the purpose of description and not of limitation.

In the improved automatic multiple spindle screw machine referred to, the base or bed of the machine is constructed in the form of a pan 200 carrying a pair of supports 201 and 202 for the two upright housings 203 and 204 and in the housing or head 203 is located the work spindle carrier or turret and in the other housing 204 is located certain gear mechanism for effecting the operation of various parts of the machine. These two housings 203 and 204 are connected at the tops thereof by a triangular beam 205 for supporting the top cross slides and other tool slides. These two housings are also connected near the bottoms thereof by a sleeve 220 through which the cam shaft 30 extends.

Figure 2:
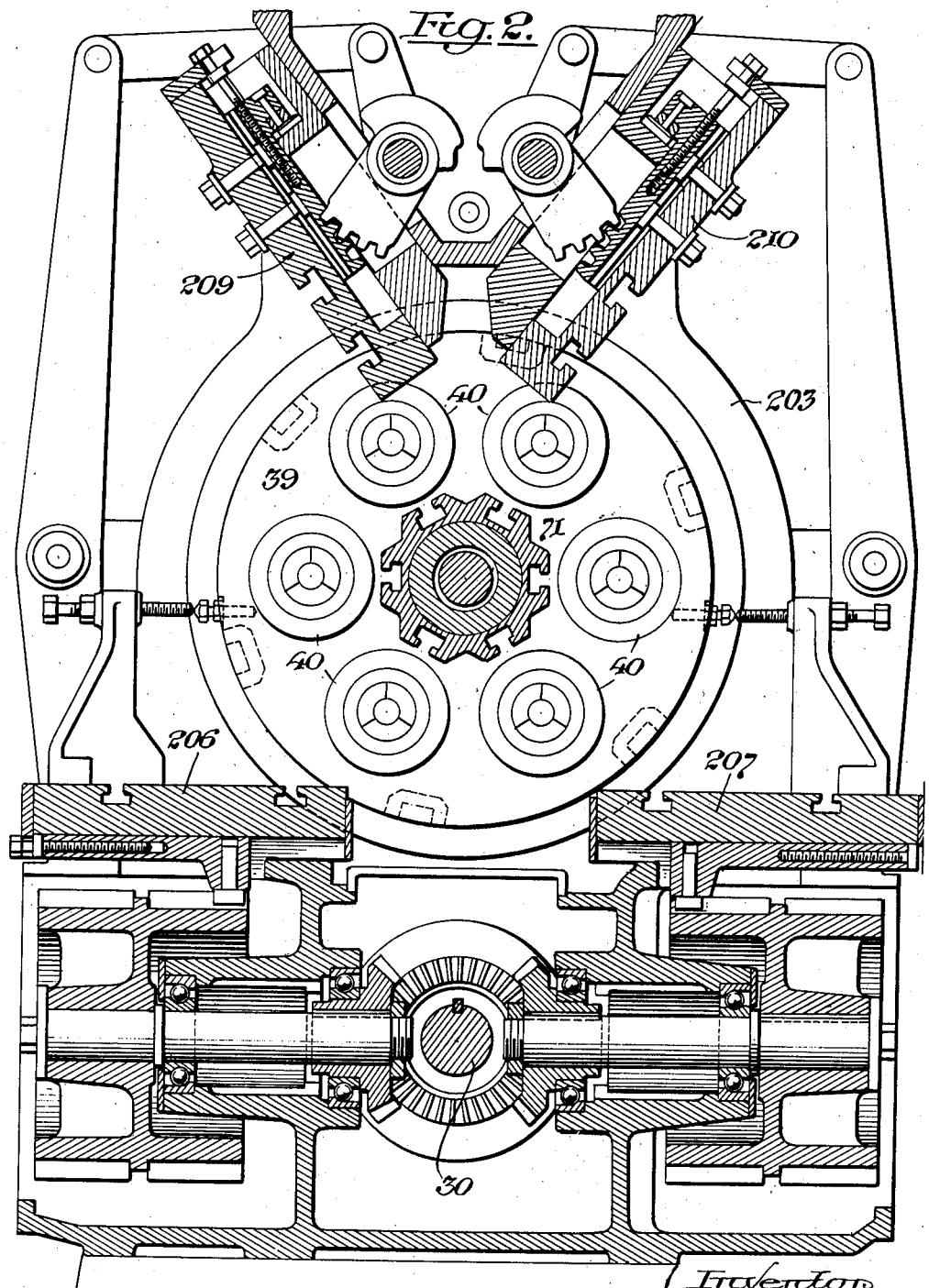
Fig. 2 is a cross sectional view taken on the line 2—2 of Fig. 1, looking toward the left and showing the position of the six work spindles.

The housing 203 has an extension carrying the side forming and cutting-off cross slides 206 and 207 while the beam 205 supports the top slides 209 and 210 (see Fig. 2) and also one or more threading tool slides 131. Suitably supported between the housings 203 and 204 is the main tool slide 71 reciprocated from the cam shaft 30 by a suitable mechanism and this main tool slide carries the end working tools hereinbefore referred to such as drills, etc.

Figure 3:
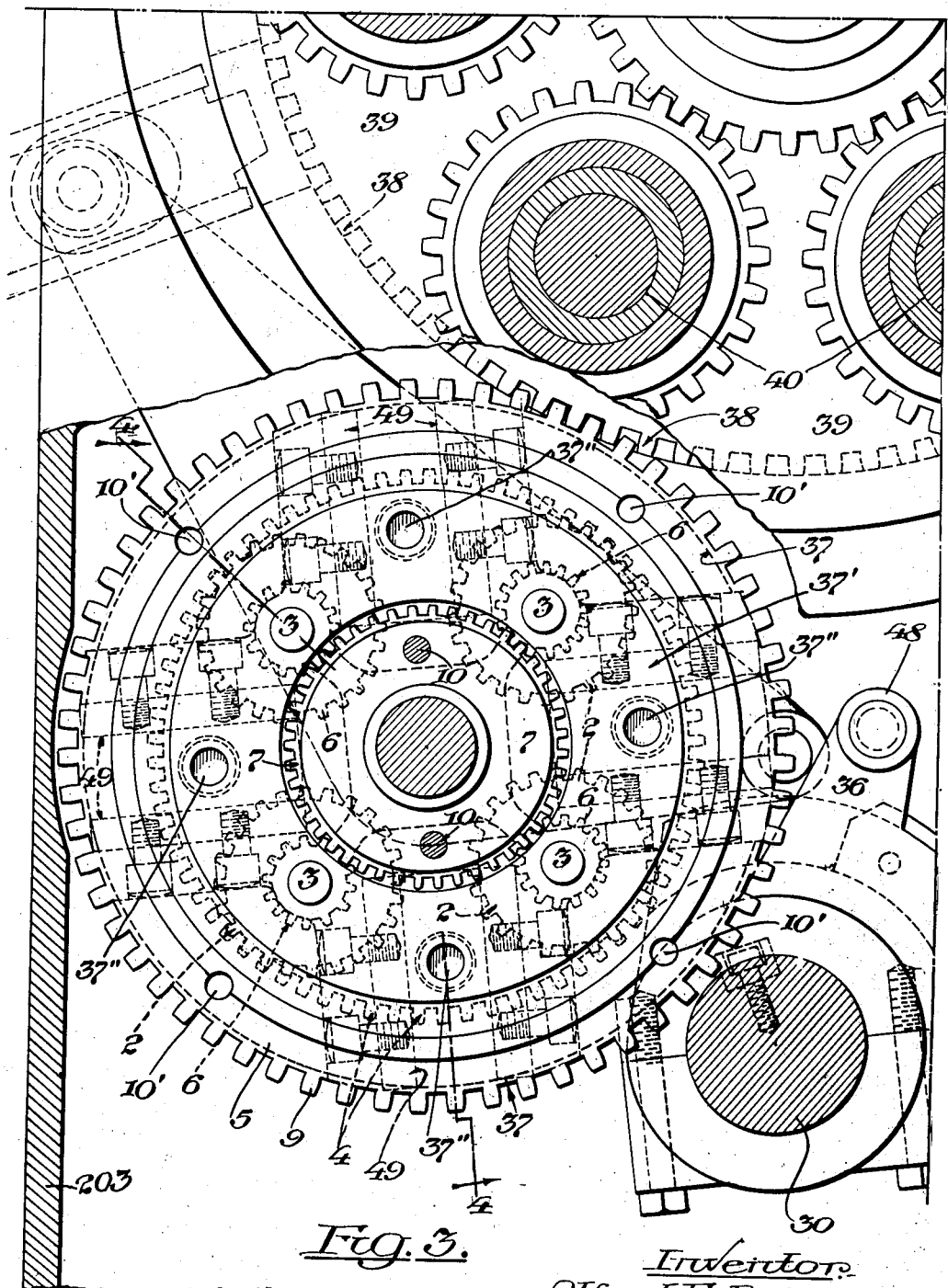
Fig. 3 illustrates this improved indexing mechanism which may be substituted for that shown in Fig. 18 of said application when a six-spindle work carrier is used, said view illustrating certain parts in section.

The work spindle carrier 39 carrying the rotary work spindles 40 is mounted for indexible movement in the housing 203 and is provided with a gear 38 in position to mesh with an indexing gear 5 carried and rotated by an indexing disk 37 operated by the cam shaft 30. This gear 5 is operated as a unit with the disk 37 at one time and at another time is operated by the disk 37 through planetary gearing independently of said disk 37 and at a different speed so that as the cam shaft 30 (see Fig. 3) rotates, the arm 36 carried thereby successively engages through its roll 48 with four sets or pairs of lugs 49 secured to the indexing disk 37 and this indexing disk 37 through the means about to be described, rotates the gear 38 fastened to the work spindle carrier 39, thereby indexing the carrier from one spindle position to the next. Suitable locking mechanism is, of course, provided to lock the work spindle carrier in its indexed position.

The indexing disk 37 shown as a gear in the application hereinbefore referred to, carries four sets of lugs which may be utilized for indexing a four, five or six spindle machine. In the present instance, they are utilized to index a six spindle machine.

In a six spindle machine, it is frequently desirable, for plain work, to utilize only three work spindles or three sets of two spindles. Therefore, it is essential that an indexing mechanism be provided that will index a work spindle carrier one-third instead of one sixth of a cycle. This permits each pair of adjacent work spindles to be utilized for the performance of the same work thus doubling the capacity of the machine although, as hereinbefore explained, even when the work spindle is indexed one-third at each indexing movement, different kinds of work may be performed on each spindle of a pair. Therefore, the present improvement consists in the provision of an improved indexing mechanism by means of which the work spindle carrier may be indexed six times during each cycle, or by merely changing the location of certain bolts, three times during each cycle. To accomplish this, the indexing disk 37 operated by the arm 36 from the cam shaft 30 through the lugs 49, is provided with several sets of planetary gears 2 mounted on studs 3, each carried at one end by the disk 37 and projecting at its other end into an enlarged hub or casing 37' bolted to the disk 37 by bolts 37''. These gears 2 are in mesh with the interior teeth 4 of a ring gear 5 of external and internal tooth form and which, at one time may be fixed to the indexing disk 37 or be free relative thereto.

Each planetary gear 2 has fixed thereto, or integral therewith, a smaller gear 6 in mesh with a gear 7 which, at one time, may be bolted to a part of the framework 8 and at another time free thereof. The exterior teeth 9 of the ring gear 5 are in mesh with the gear 38 fixed to the work spindle carrier 39 (see Figs. 1 and 3). The disk 37 and gear 7 are mounted on a short shaft.

When the cam shaft 30 through its arm 36 and roller 48 engages one set of guides 49 of the disk 37, this index disk 37 is rotated one-fourth of a revolution and during this time the index ring gear 5 travels twice the distance or one-third of the spindle carrier instead of one-sixth by reason of the fact that each planetary gear 2 is rotated by the index disk 37 on its stud 3 and rotates its gear 6 in mesh with the stationary gear 7 which, at this time is fixed to the frame 8 by means of one or more bolts 10 while the bolt 10', or several thereof, which connect the ring gear 5 with the disk 37 have been removed. Thus, as the result of the difference in diameter between the two gears, the indexing gear travels twice the distance traveled by the disk 37.

Figure 4:
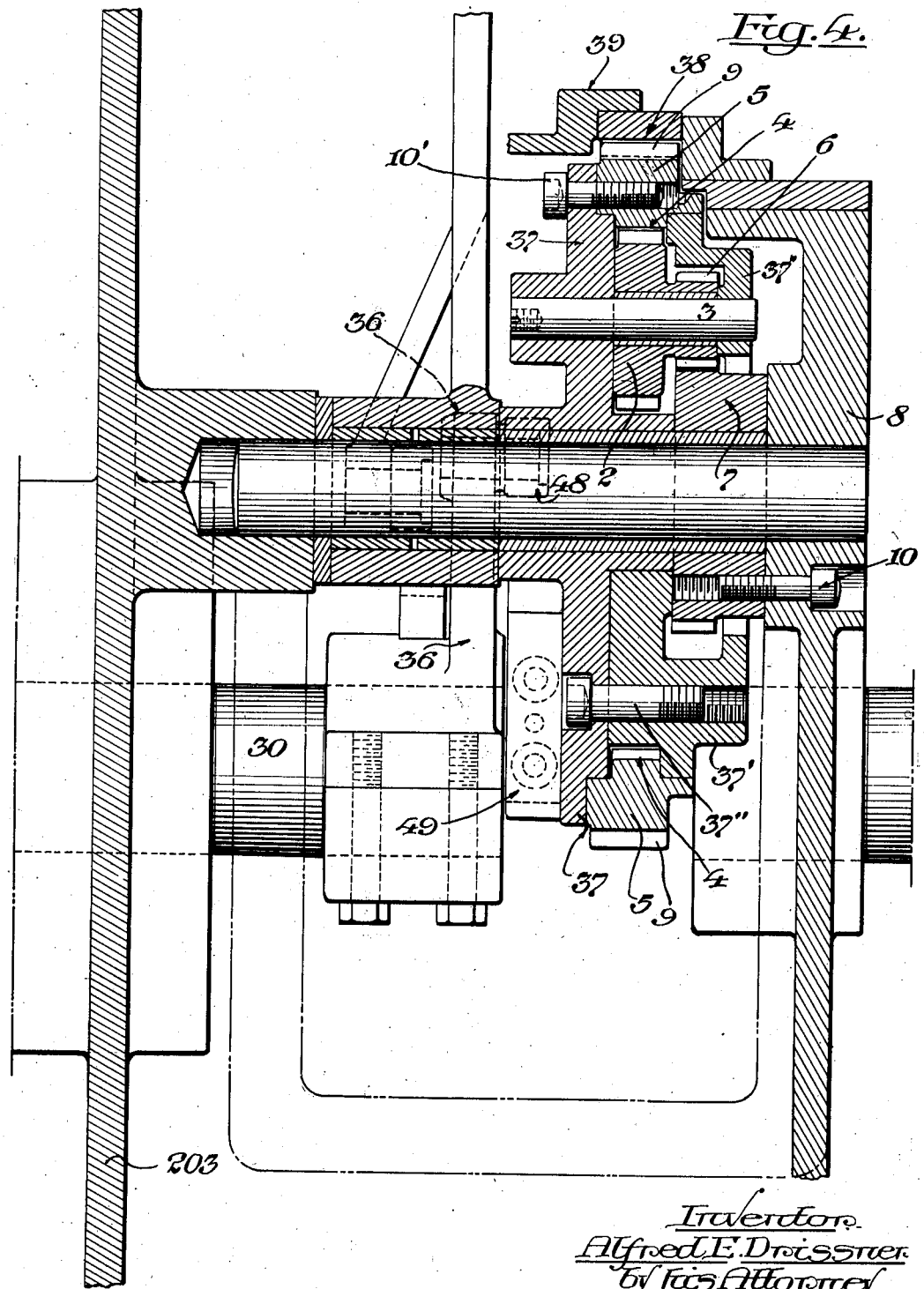
Fig. 4 is a transverse sectional view of the indexing mechanism taken on the line 4—4 of Fig. 3.
Figure 5:
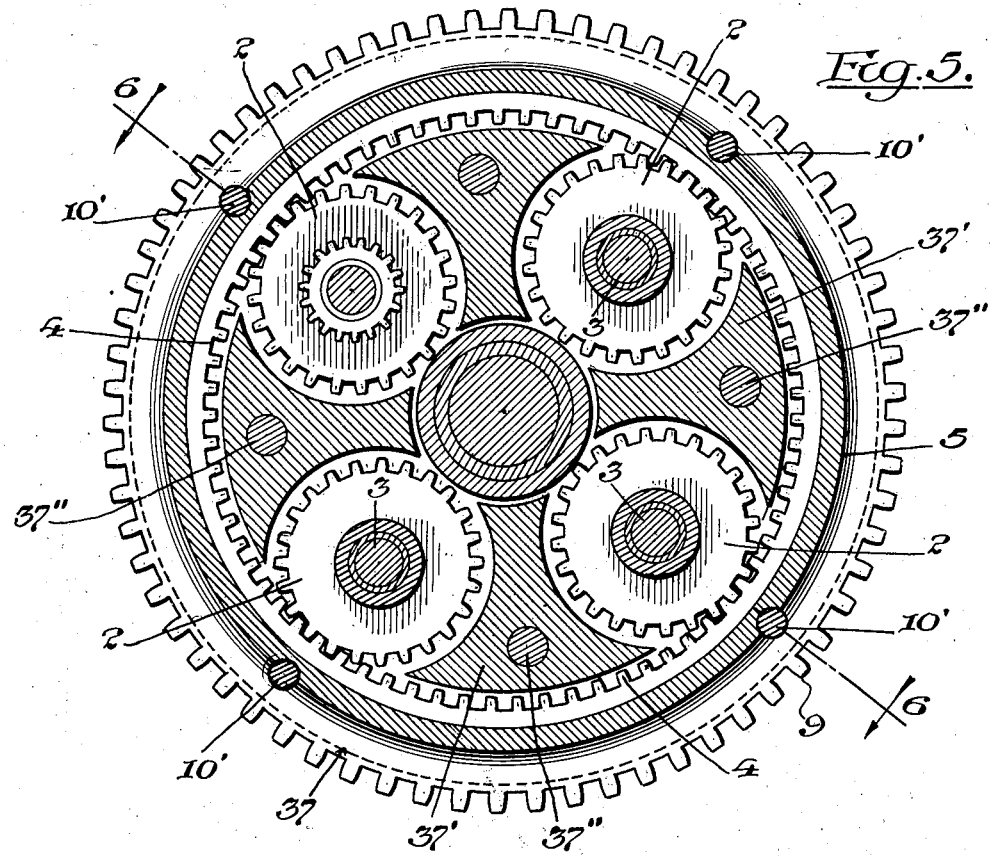
Fig. 5 is a cross sectional view taken on the line 5—5 of Fig. 6, and illustrating the planetary gearing of the indexing mechanism.
Figure 6:
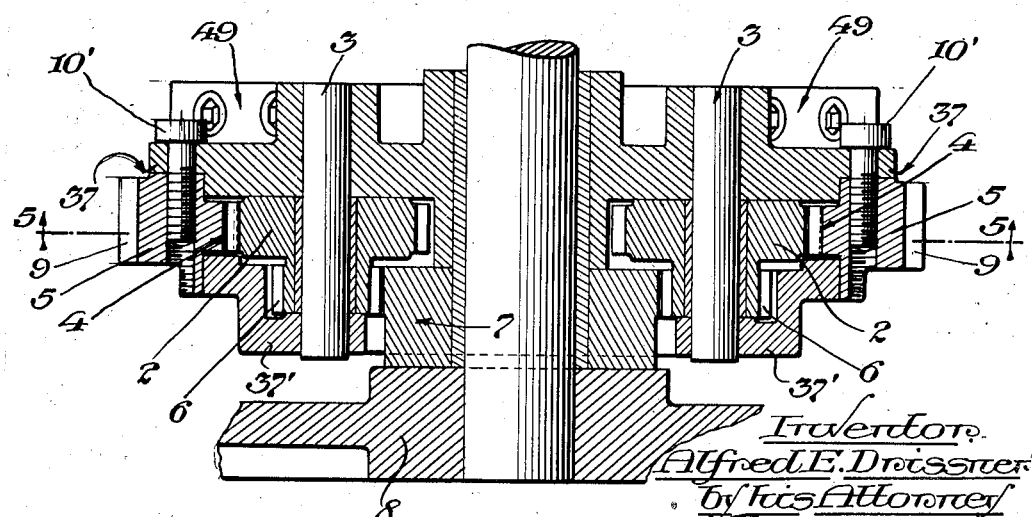
Fig. 6 is a cross sectional view taken on the line 6—6 of Fig. 5, and illustrating the planetary gearing of the indexing mechanism.

To permit the work spindle carrier to be rotated one-sixth instead of one-third, the bolt or bolts 10 used to secure the stationary gear 7 to the frame 8 are removed and placed in position to secure the ring gear 5 to the disk 37 as illustrated at 10', Fig. 4. In other words, when the work spindle cylinder is to be indexed one-third, the bolt or bolts 10' are removed and the bolt 10 used to fasten the gear 7 to the frame 8 but when the cylinder is to be indexed one-sixth, the bolt or bolts 10 are removed and used to fasten the ring gear 5 to the disk 37 so that they act as a unit. When the bolt 10' is removed, the index ring gear 5 will rotate freely on the disk 37 and its hub 37' and so index the work spindle carrier one-third but when the bolt 10' is in position, this ring gear 5 is then fixed to the disk 37 and will rotate with the latter and index the cylinder one-sixth, the bolt 10 at that time being removed and allowing the stationary gear 7 to rotate with the indexing gears.

Thus, this planetary gear mechanism applied to the index disk 37 performs no work when it is desired to rotate the work spindle carrier one-sixth but when it is desired to rotate it one-third, it acts as a planetary gear mechanism so that, when the gear 7 is fixed to the frame 8 by the bolt 10 and the ring gear 5 is free of connection with the disk 37, the rotation of the disk 37 rotates through the sets of planetary gears 2 and 3 to rotate the ring gear 5 and thereby the gear 38 and its work carrier 39 one-third of a revolution during each cycle, but when the bolt 10 is removed, thereby disconnecting the gear 7 from the frame 8 this gear can, of course, turn with the gears 2 and 3 and as, at this time, the bolt 10' is in place connecting the ring gear 5 with the disk 37, this ring gear 5 operates as a unit with the disk 37 to rotate the work spindle gear 38 and its carrier 39 one-sixth since the gears 2, 3 and 7 at this time are practically idle gears.

Thus, by means of the present improved indexing mechanism, a six-spindle work carrier may be rotated either one-third or one-sixth according to the amount of work that is to be done and similar work may be done on the work of each pair of spindles duplicating the amount of work turned out by the machine in each cycle of the indexible work spindle carrier, it requiring but the simple removal and replacement of the bolts 10 and 10' to accomplish this desirable result.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an indexing mechanism for automatic multiple spindle screw machines having an indexible work spindle carrier provided with a series of six rotary work spindles, gear means for engaging and indexing said carrier and thereby indexing the spindles equal to the number of work spindles, or less than the number of said spindles, and means for varying the setting of said gear means.

2. In an indexing mechanism for automatic multiple spindle screw machines having an indexible work spindle carrier provided with an indexing gear and with a series of rotary work spindles, a shaft, means including planetary gearing between said shaft and said spindle carrier gear for indexing said carrier equal to the number of work spindles, or less than the number of said spindles, and means for varying the setting of said planetary gearing.

3. In an indexing mechanism for automatic multiple spindle screw machines having an indexible work spindle carrier provided with an indexing gear and with a series of rotary work spindles, a cam shaft, means including planetary gearing between said cam shaft and said spindle carrier gear for indexing said carrier equal to the number of work spindles, or less than the number of said spindles, and means for neutralizing said gearing.

4. In an indexing mechanism for automatic multiple spindle screw machines having an indexible work spindle carrier provided with an indexing gear and with a series of rotary work spindles, and means including planetary gearing for indexing said carrier gear equal to the number of work spindles, or less than the number of said spindles and including means for binding one part of said means in fixed position and releasing another part thereof.

5. In an indexing mechanism for automatic multiple spindle screw machines having an indexible work spindle carrier provided with a series of rotary work spindles, and means for indexing said carrier equal to the number of work spindles, or less than the number of said spindles and comprising rotatable means, means adapted to operate as a unit with and by said rotatable means or operative thereby at a different speed, and means for connecting a part of said last means with said rotatable means or disconnecting it therefrom and connecting another part of said last means with a fixed part.

6. In an indexing mechanism for automatic multiple spindle screw machines having an indexible work spindle carrier provided with a series of six rotary work spindles and a cam shaft, gear means between said cam shaft and said spindle carrier for engaging and indexing the carrier and thereby the work spindles one-third or one-sixth of a revolution during each cycle, and means for varying the setting of said gear means.

7. In an indexing mechanism for automatic multiple spindle screw machines having an indexible work spindle carrier provided with a series of rotary work spindles and a cam shaft, means between said cam shaft and said spindle carrier for indexing the carrier and including means for binding one part of said means in fixed position and releasing another part thereof thereby to index the work carrier one-sixth of a revolution during each cycle and for binding said last part and releasing said first part thereby to index the work carrier one-third of a revolution during each cycle.

8. In an indexing mechanism for automatic multiple spindle screw machines having an indexible work spindle carrier provided with a series of rotary work spindles and a cam shaft, means between said cam shaft and said spindle carrier for indexing the carrier and including similar means for binding one part of said means in fixed position and releasing another part thereof thereby to index the work carrier one-sixth of a revolution during each cycle and for binding said last part and releasing said first part thereby to index the work carrier one-third of a revolution during each cycle.

9. In an indexing mechanism for automatic multiple spindle screw machines having an indexible work spindle carrier provided with an indexing gear and with a series of rotary work spindles and a cam shaft, means between said cam shaft and said spindle carrier for indexing the carrier gear one-third or one-sixth of a revolution during each cycle and comprising gearing including planetary gearing and means for neutralizing said planetary gearing.

10. In an indexing mechanism for automatic multiple spindle screw machines having an indexible work spindle carrier provided with a series of rotary work spindles and a cam shaft, means between said cam shaft and said spindle carrier for indexing the carrier and comprising gearing and including means for binding one gear in fixed position and releasing another gear thereby to index the spindle carrier equal to the number of work spindles or less than the number thereof.

11. In an indexing mechanism for automatic multiple spindle screw machines having an indexible work spindle carrier provided with a series of rotary work spindles and a cam shaft, means between said cam shaft and said spindle carrier for indexing the carrier and comprising a gear carried by the carrier, a gear in mesh therewith, means for operating said last gear as a unit therewith thereby to index the carrier equal to the number of work spindles, and means operated by said operating means for operating said last gear independently thereof thereby to index the carrier less than the number of work spindles.

12. In an indexing mechanism for automatic multiple spindle screw machines having an indexible work spindle carrier provided with a series of rotary work spindles and a cam shaft, means between said cam shaft and said spindle carrier for indexing the carrier and comprising a gear carried by the carrier, a disk operated from the cam shaft, gearing between said disk and gear, and means for binding one part of said gearing at one time and releasing it at another thereby to index the spindle carrier equal to the number of work spindles or less than the number thereof.

13. In an indexing mechanism for automatic multiple spindle screw machines having an indexible work spindle carrier provided with a series of rotary work spindles and a cam shaft, means between said cam shaft and said spindle carrier for indexing the carrier and comprising gearing, one part thereof having a fixed relation at one time and a free relation at another time thereby to index the spindle carrier equal to the number of work spindles or less than the number thereof.

14. In an indexing mechanism for automatic multiple spindle screw machines having an indexible work spindle carrier provided with a series of rotary work spindles and a cam shaft, means between said cam shaft and said spindle carrier for indexing the carrier one-third or one-sixth of a revolution during each cycle and comprising gearing including a disk operated by the cam shaft, a gear carried by the carrier, gearing therebetween, and means for bolting a part of said gearing to the cam shaft disk at one time and to the framework at another time.

15. In an indexing mechanism for automatic multiple spindle screw machines having an indexible work spindle carrier provided with a series of rotary work spindles and a cam shaft, means between said cam shaft and said spindle carrier for indexing the carrier one-third or one-sixth of a revolution during each cycle and comprising gearing including a gear carried by the carrier, a disk operated by the cam shaft and therebetween a ring gear in mesh with the carrier gear and adapted to be bolted to the cam operated disk, a gear adapted to be bolted to the framework, and planetary gearing between said last gear and said ring gear, the gear structure being such that upon the bolting of the ring gear to the cam operated disk, the cylinder will be operated during each cycle equivalent to the number of rotary spindles and when released therefrom and another of said gears bolted to the framework the cylinder will be operated a less number of times during each cycle.

16. In an indexing mechanism for automatic multiple spindle screw machines having an indexible work spindle carrier provided with a series of six rotary work spindles and a cam shaft, means between said cam shaft and said spindle carrier for indexing the carrier one-third or one-sixth of a revolution during each cycle and comprising gearing including a gear carried by the carrier, a disk operated by the cam shaft and therebetween a ring gear in mesh with the carrier gear and adapted to be bolted to the cam operated disk, a gear adapted to be bolted to the framework, and planetary gearing between said last gear and said ring gear, the gear structure being such that upon the bolting of the ring gear to the cam operated disk, the cylinder will be operated six times during each cycle and when released therefrom and another of said gears bolted to the framework, the cylinder will be operated three times during each cycle.

17. In an indexing mechanism for automatic multiple spindle screw machines having an indexible work spindle carrier provided with a series of rotary work spindles and a cam shaft, means between said cam shaft and said spindle carrier for indexing the carrier equal to the number of work spindles or less than the number of work spindles and comprising a gear carried by the carrier, a disk operated by the cam shaft and having a series of sets of lugs less than the number of spindles and between said disk and gear a ring gear in mesh with the carrier gear and adapted to be bolted to the cam operated disk, a gear adapted to be bolted to the framework, and planetary gearing between said last gear and said ring gear, the gear structure being such that upon the bolting of the ring gear to the cam operated disk, the cylinder will be operated during each cycle equivalent to the number of rotating spindles and when released therefrom and another of said gears bolted to the framework, the cylinder will be operated a less number of times during each cycle.

18. In an indexing mechanism for automatic multiple spindle screw machines having an indexible work spindle carrier provided with a series of six rotary work spindles and a cam shaft, means between said cam shaft and said spindle carrier for indexing the carrier equal to the number of work spindles or less than the number of work spindles and comprising a gear carried by the carrier, a disk operated by the cam shaft and having a series of sets of lugs less than the number of spindles and between said disk and gear a ring gear in mesh with the carrier gear and adapted to be bolted to the cam operated disk, a gear adapted to be bolted to the framework, and planetary gearing between said last gear and said ring gear, the gear structure being such that, upon the bolting of the ring gear to the cam operated disk, the cylinder will be operated during each cycle equivalent to the number of rotating spindles and when released therefrom and another of said gears bolted to the framework, the cylinder will be operated a less number of times during each cycle than the number of sets of lugs.

19. In an indexing mechanism for automatic multiple spindle screw machines having an indexible work spindle carrier provided with a series of six rotary work spindles and a cam shaft, means between said cam shaft and said spindle carrier for indexing the carrier equal to the number of work spindles or less than the number of work spindles and comprising a gear carried by the carrier, a disk operated by the cam shaft and having a series of sets of lugs less than the number of spindles and having a laterally extending hub, and between said disk and gear a ring gear mounted on said disk and in mesh with the carrier gear and adapted to be bolted to the cam operated disk, a gear adapted to be bolted to the framework, and planetary gearing between said last gear and said ring gear, the gear structure being such that, upon the bolting of the ring gear to the cam operated disk, the cylinder will be operated during each cycle equivalent to the number of rotating spindles and when released therefrom and another of said gears bolted to the framework, the cylinder will be operated a less number of times during each cycle.

20. In an indexing mechanism for automatic multiple spindle screw machines having an indexible work spindle carrier provided with a series of rotary work spindles, and means for indexing the carrier equivalent to the number of work spindles or less than the number thereof and comprising a member operatively connected with the carrier, a member for operating said member, a plurality of co-operating members between said members, means for securing one of said plurality of members to one of said first members, and means for securing one of said plurality of members to a fixed part, the removal of one of said securing means effective to permit the cylinder to be indexed during each cycle equivalent to the number of spindles carried thereby and the removal of the other of said securing means effective to permit the cylinder to be indexed a less number of times during each cycle than the number of spindles carried thereby.

21. In an indexing mechanism for automatic multiple spindle screw machines having an indexible work spindle carrier provided with an indexing gear and with a series of rotary work spindles and a rotating shaft, means between said shaft and spindle carrier gear for indexing the carrier and comprising gearing including a planetary gear mechanism, and means for rendering said planetary gear mechanism ineffective or effective thereby to index the carrier equal to the number of work spindles or less than the number thereof.

22. In an indexing mechanism for automatic multiple spindle screw machines having an indexible work spindle carrier provided with an indexing gear and with a series of rotary work spindles and a rotating shaft, means between said shaft and spindle carrier gear for indexing the carrier and comprising gearing including a disk, a ring gear and planetary gear mechanism, and means for rendering said planetary gear mechanism ineffective or effective thereby to index the carrier equal to the number of work spindles or less than the number thereof.

23. In an indexing mechanism for automatic multiple spindle screw machines having an indexible work spindle carrier provided with an indexing gear and with a series of more than three rotary work spindles, means for engaging and indexing the work spindle carrier gear and thereby indexing the work spindles equal to the number of work spindles or a plurality thereof at each indexing, and means for varying the setting of said means.

24. In an indexing mechanism for automatic multiple spindle screw machines having an indexible work spindle carrier provided with an indexing gear and with a series of more than three rotary work spindles, means for engaging and indexing the work spindle carrier and thereby indexing the work spindles equal to the number of work spindles or a plurality thereof at each indexing and including planetary gearing co-operating with said indexing gear, and means for neutralizing said gearing.

25. In an indexing mechanism for automatic multiple spindle screw machines having an indexible work spindle carrier provided with an indexing gear and with a series of more than three rotary work spindles, means for engaging and indexing the work spindle carrier and thereby indexing the work spindles equal to the number of work spindles or a plurality thereof at each indexing and including gear mechanism co-operating with said indexing gear, and means for rendering a part of said gear mechanism effective at one time and ineffective at another time.

26. In an indexing mechanism for automatic multiple spindle screw machines having an indexible work spindle carrier provided with a series of more than three rotary work spindles, means for engaging and indexing the work spindle carrier and thereby indexing the work spindles equal to the number of work spindles or a plurality thereof at each indexing and including a cam shaft and gear mechanism comprising a gear carried by the work spindle carrier, a gear in mesh therewith, means operative from said shaft for rotating said last gear as a unit therewith to index the carrier equal to the number of spindles or rotate it independently thereof to index the carrier a plurality of spindles at a time.

27. In an indexing mechanism for automatic multiple spindle screw machines having an indexible work spindle carrier provided with a series of more than three rotary work spindles, means for engaging and indexing the work spindle carrier and thereby indexing the work spindles equal to the number of work spindles or a plurality thereof at each indexing and including a cam shaft, a gear mechanism comprising a gear carried by the work spindle carrier, a gear in mesh therewith, means operative from said shaft for rotating said last gear as a unit therewith to index the carrier equal to the number of spindles or rotate it independently thereof to index the carrier a plurality of spindles at a time and including planetary gearing, and means for rendering said planetary gearing effective or ineffective.

28. In an indexing mechanism for automatic multiple spindle screw machines having an indexible work spindle carrier provided with a series of more than three rotary work spindles, means for engaging and indexing the work spindle carrier and thereby indexing the work spindles equal to the number of work spindles or a plurality thereof at each indexing and including a cam shaft, gear mechanism comprising a gear carried by the work spindle carrier, a gear in mesh therewith, means operative from said shaft for rotating said last gear as a unit therewith to index the carrier equal to the number of spindles or rotate it independently thereof to index the carrier a plurality of spindles at a time and including planetary gearing, and means for rendering said planetary gearing effective or ineffective and comprising a detachable fastening.

29. In an indexing mechanism for automatic multiple spindle screw machines having an indexible work spindle carrier provided with a series of more than three rotary work spindles, means for engaging and indexing the work spindle carrier and thereby indexing the work spindles equal to the number of work spindles or a plurality thereof at each indexing and including a cam shaft, gear mechanism comprising a gear carried by the work spindle carrier, a gear in mesh therewith, means operative from said shaft for rotating said last gear as a unit therewith to index the carrier equal to the number of spindles or rotate it independently thereof to index the carrier a plurality of spindles at a time and including planetary gearing, and means for rendering said planetary gearing effective or ineffective and comprising a detachable fastening operative in one position at one time and in another position at another time.

30. In an indexing mechanism for automatic multiple spindle screw machines having an indexible work spindle carrier provided with a series of more than three rotary work spindles, means for engaging and indexing the work spindle carrier and thereby indexing the work spindles equal to the number of work spindles or a plurality thereof at each indexing and including a cam shaft, gear mechanism comprising a gear carried by the work spindle carrier, a gear in mesh therewith, means operative from said shaft for rotating said last gear as a unit therewith to index the carrier equal to the number of spindles or rotate it independently thereof to index the carrier a plurality of spindles at a time and including planetary gearing, and means for rendering said planetary gearing effective or ineffective and comprising interchangeable bolts.

ALFRED E. DRISSNER.